United States Patent
Hamlin et al.

(10) Patent No.: US 10,541,994 B2
(45) Date of Patent: Jan. 21, 2020

(54) TIME BASED LOCAL AUTHENTICATION IN AN INFORMATION HANDLING SYSTEM UTILIZING ASYMMETRIC CRYPTOGRAPHY

(71) Applicant: Dell Products, L.P., Round Rock, TX (US)

(72) Inventors: Daniel L. Hamlin, Round Rock, TX (US); Minhaj Ahmed, Allen, TX (US); Charles D. Robison, Buford, GA (US)

(73) Assignee: Dell Products, L.P., Round Rock, TX (US)

( * ) Notice: Subject to any disclaimer, the term of this patent is extended or adjusted under 35 U.S.C. 154(b) by 627 days.

(21) Appl. No.: 15/135,789

(22) Filed: Apr. 22, 2016

(65) Prior Publication Data
US 2017/0310662 A1 Oct. 26, 2017

(51) Int. Cl.
*H04L 29/06* (2006.01)
*H04L 9/32* (2006.01)
*H04L 9/08* (2006.01)

(52) U.S. Cl.
CPC ........ *H04L 63/0846* (2013.01); *H04L 9/3228* (2013.01); *H04L 63/0442* (2013.01); *H04L 63/0838* (2013.01); *H04L 9/0863* (2013.01)

(58) Field of Classification Search
CPC .... G06F 21/31; H04L 63/0869; H04L 9/0863
USPC ...................................................... 713/168
See application file for complete search history.

(56) References Cited

U.S. PATENT DOCUMENTS

| | | | | |
|---|---|---|---|---|
| 2003/0084304 A1* | 5/2003 | Hon | ..................... | G06Q 20/367 713/185 |
| 2006/0177056 A1* | 8/2006 | Rostin | ................... | H04L 9/0869 380/46 |
| 2008/0168543 A1* | 7/2008 | von Krogh | ............. | G06F 21/31 726/6 |
| 2011/0307706 A1* | 12/2011 | Fielder | ................ | G06F 21/6209 713/181 |
| 2014/0164762 A1* | 6/2014 | Lee | ...................... | H04L 63/0869 713/155 |
| 2015/0319171 A1 | 11/2015 | Robison et al. | | |
| 2016/0065378 A1* | 3/2016 | Kim | ...................... | H04L 9/0863 713/184 |
| 2017/0126408 A1* | 5/2017 | Van Someren | ....... | H04L 9/0863 |

OTHER PUBLICATIONS

Broadcom Corporation, "BCM5880 Cryptographic Module Security Policy, Document Version 1.1", Revision Date: Feb. 2, 2010, 28 Pages.

* cited by examiner

*Primary Examiner* — Bryan F Wright
(74) *Attorney, Agent, or Firm* — Fogarty LLP (57) ABSTRACT

In an example of a system and method for time-based local authentication, an Information Handling System (IHS) may include a processor and a memory coupled to the processor. The memory may have program instructions stored thereon that, upon execution, cause the IHS to generate a first time token and to transmit the first time token to a secondary IHS via a local network, where the secondary IHS is configured to generate a second time token and to transmit the second time token to the IHS via the local network. The IHS may receive the second time token from the secondary IHS and it may determine whether the first time token matches the second time token. In response to the first time token matching the second time token, the IHS may receive access to a protected resource.

19 Claims, 4 Drawing Sheets

TIME BASED LOCAL AUTHENTICATION IN AN INFORMATION HANDLING SYSTEM UTILIZING ASYMMETRIC CRYPTOGRAPHY

FIELD

This disclosure relates generally to Information Handling Systems (IHSs), and more specifically, to systems and methods for time-based local authentication.

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Typically, credentials used to access a protected IHS—e.g., a username and password for logging into the IHS—or protected data stored within the IHS can be used multiple times or be "replayed." In contrast, one-time passwords (OTPs) allow for an IHS to authenticate to an OTP and then remove that OTP from future usage. That is, each time a user wants to authenticate to the IHS, he or she needs to generate a new OTP.

The process of generating an OTP is performed independently on both the client and the authentication sides, which requires that an OTP algorithm be executed on both sides and that a same seed be used. Generally speaking, if a small set of OTPs can be obtained, the seed, and, ultimately, a pattern, may also be obtained.

Time-based OTP (e.g., RFC 6238) is an OTP technique that uses the current time as the seed for the algorithm to generate an OTP. Using this method, "replay" is not a possible attack vector. The inventors hereof have recognized, however, that conventional time-based OTP requires that the time be maintained at a central location and/or the time be distributed to both the client and the authentication sides. This in turn requires a substantial infrastructure setup, and is not conducive to a locally-managed environment.

SUMMARY

Embodiments of systems and methods for time-based local authentication are described herein. In an illustrative, non-limiting embodiment, an Information Handling System (IHS) may include a processor and a memory coupled to the processor, the memory having program instructions stored thereon that, upon execution, cause the IHS to: generate a first time token; transmit the first time token to a secondary IHS via a local network, where the secondary IHS is configured to generate a second time token and to transmit the second time token to the IHS via the local network; receive the second time token from the secondary IHS; determine whether the first time token matches the second time token; and in response to the first time token matching the second time token, provide the IHS with access to a protected resource.

In some implementations, the first time token and the second time token may be generated using a one-time password (OTP) algorithm. The IHS may include a laptop or desktop computer, and the secondary IHS may include a phone, tablet, or watch. To determine whether the first time token matches the second time token, the program instructions, upon execution, may further cause the IHS to determine whether the first time token is within a selected time interval from the second time token.

In some cases, the processor and the memory may be part of an off-host authentication processing system within the IHS, the IHS may further an embedded controller coupled to the host processor and to the off-host processor, and the off-host authentication processing system may provide a hardware environment segregated from a host processor and a host memory within the IHS. The protected resource may include a password stored in the off-host memory as an object retrievable by the off-host processor only upon a determination that the first time token matches the second time token.

Generating the first time token may occur in response to user attempting to log into the IHS, and providing the IHS with access to the protected resource may include allowing the user to log into the IHS. The program instructions, upon execution by the processor, may further cause the processor to: prior to transmitting the first time token to the secondary IHS, encrypt the first time token with an IHS public key associated with the IHS and with a secondary IHS public key associated with the secondary IHS into a first payload, where transmitting the first time token to the secondary IHS includes transmitting the first payload to the secondary IHS. The secondary IHS may be configured to decrypt the first payload with a secondary IHS private key associated with the second IHS into a second payload.

The secondary IHS may be configured to concatenate the second payload with the second time token, to encrypt the concatenation with the IHS public key into a third payload, and to encrypt the third payload with the secondary IHS private key into a fourth payload, and transmitting the second time token to the IHS may include transmitting the fourth payload to the IHS. Receiving the second time token from the secondary IHS may include receiving the fourth payload from the secondary IHS, and the program instructions, upon execution by the processor, may further cause the processor to decrypt the fourth payload with the secondary IHS public key into a fifth payload.

The program instructions, upon execution by the processor, may further cause the processor to decrypt the fifth payload with the IHS private key into a sixth payload. The program instructions, upon execution by the processor, may further cause the processor to extract the second time token and an encrypted first time token from the sixth payload. The program instructions, upon execution by the processor, may further cause the processor to decrypt the IHS time token with the IHS private key to extract the first time token.

In another illustrative, non-limiting embodiment, a memory may have instructions stored thereon that, upon execution by a processor of an IHS, cause the IHS to: generate a first time token; transmit the first time token to a secondary IHS via a local network, wherein the secondary IHS is configured to generate a second time token and to transmit the second time token to the IHS via the local network; receive the second time token from the secondary IHS; determine whether the first time token matches the second time token; and in response to the first time token matching the second time token, provide the IHS with access to a protected resource.

In yet another illustrative, non-limiting embodiment, a method in an IHS may include generating a first time token; transmitting the first time token to a secondary IHS via a local network, where the secondary IHS is configured to generate a second time token and to transmit the second time token to the IHS via the local network; receiving the second time token from the secondary IHS; determining whether the first time token matches the second time token; and in response to the first time token matching the second time token, providing the IHS with access to a protected resource.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Systems and methods described herein may provide time-based local authentication. In various embodiments, the techniques described below enable generation of an OTP in a locally-managed environment that is time-based and utilized through a trusted and secure third-party communication. For example, these techniques may involve the use of a paired and trusted external processing device (e.g., a phone, smart watch, a secondary computer, etc.) that is capable of generating asymmetric keys, maintain a system clock, and/or perform encryption operations.

An OTP may be generated based on a time algorithm on the trusted computing environment. The OTP may be encrypted by asymmetric keys from the computing environment and the external device. A package may be sent to the external processing device using different methods (e.g., USB direct, Bluetooth, NFC, RFID, etc.). The external processing device may decrypt the packet to ensure it is originated from a trusted device.

Upon verification of the payload that is provided from a trusted entity, the external processing environment may generate its own OTP, also based on time. Upon creation of the latter token, the OTP may be appended to the decrypted blob and encrypted by the external processing device. This new blob may be sent back to the trusted computing environment.

After receipt of the blob, the trusted computing environment may decrypt the file to ensure it was from a trusted external entity. Additionally, it may decrypt the originally sent OTP.

Upon decryption of both candidate OTPs, these two items may be verified against one another. If the two OTPs match (i.e., if the two OTPs are exactly the same or have been generated within a predetermined time window), access to or authorization to protected material within the trusted computing environment may be allowed. Conversely, if the to OTPs do not match, errors may be provided.

For purposes of this disclosure, an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
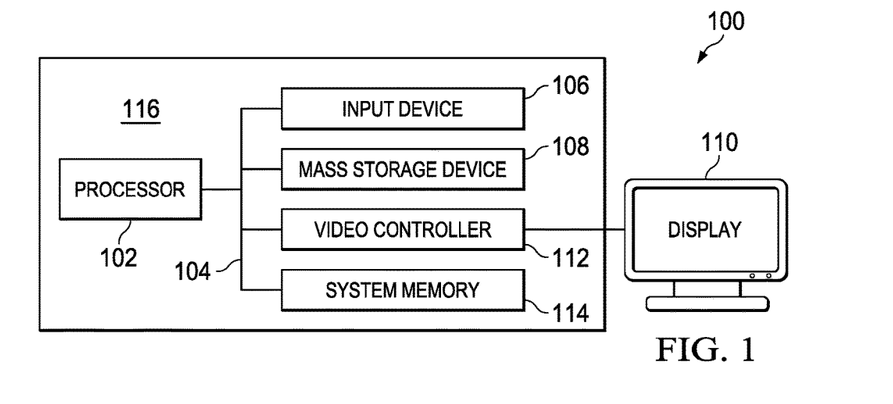
FIG. 1 is a schematic view illustrating an example of an Information Handling System (IHS) according to some embodiments.

FIG. 1 is a schematic view illustrating an example of an IHS according to some embodiments. As shown, IHS 100 includes processor 102, which is connected to bus 104. Bus 104 serves as a connection between processor 102 and other components of IHS 100. Input device 106 is coupled to processor 102 to provide input to processor 102. Examples of input devices may include keyboards, touchscreens, pointing devices such as mice, trackballs, and trackpads, and/or a variety of other input devices. Programs and data are stored on mass storage device 108, which is coupled to processor 102. Examples of mass storage devices may include hard discs, optical disks, magneto-optical discs, solid-state storage devices, and/or a variety other mass storage devices known in the art.

IHS 100 further includes display 110, which is coupled to processor 102 by video controller 112. System memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices. In an embodiment, chassis 116 houses some or all of the components of IHS 100. It should be understood that other buses and intermediate circuits may be deployed between the components described above and processor 102 to facilitate interconnection between those components and processor 102.

Figure 2:
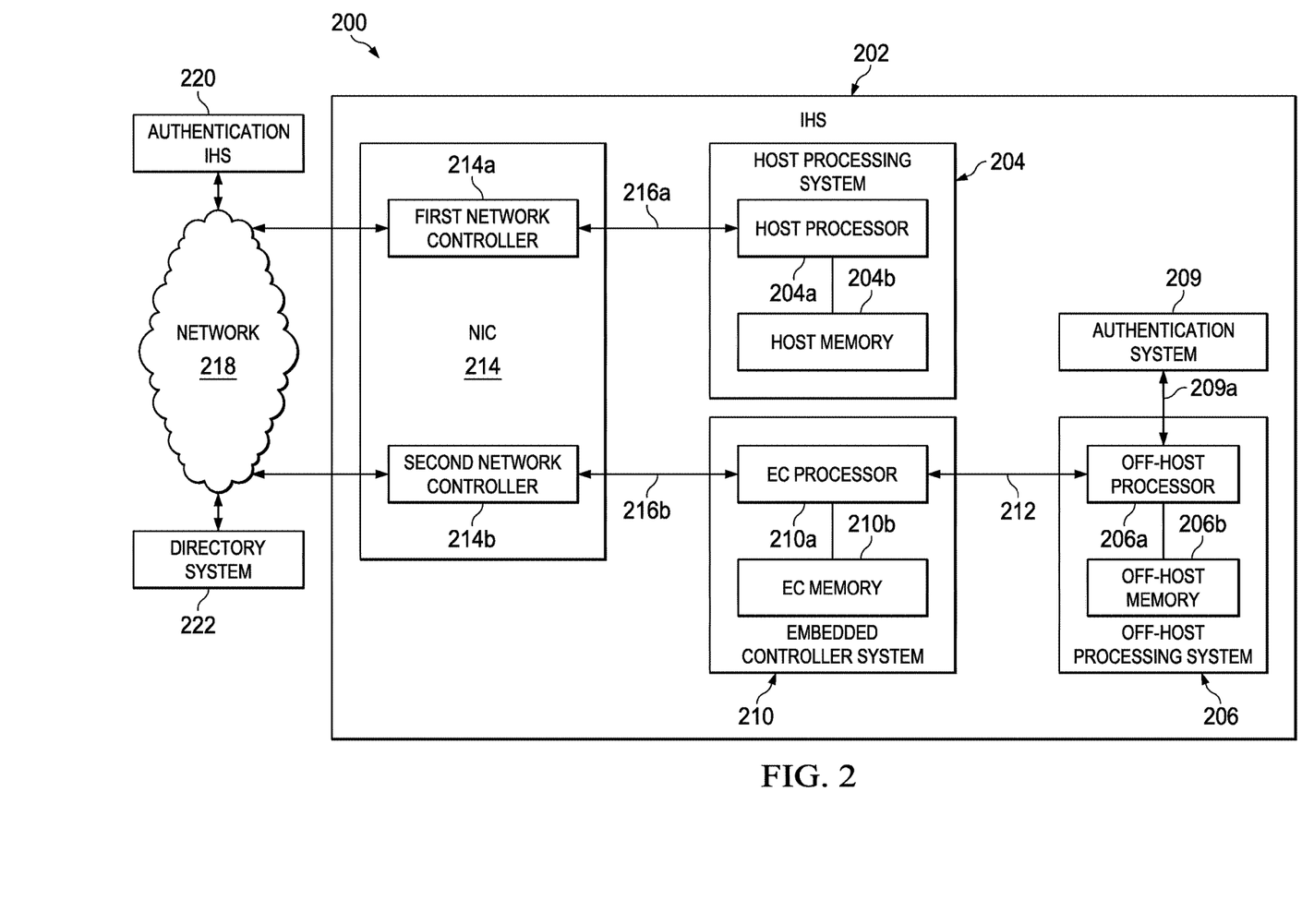
FIG. 2 is a schematic view illustrating an example of an environment where an off-host authentication processing system may be used according to some embodiments.

Referring now to FIG. 2, an embodiment of environment 200 where off-host authentication processing system 206 may be used is illustrated. Environment 200 includes IHS 202, which may be IHS 100 and/or may include some or all of the components of IHS 100. For example, IHS 100 may be a server IHS, a desktop IHS, a laptop/notebook IHS, a tablet IHS, a mobile phone IHS, and/or a variety of other IHSs. IHS 202 comprises host processing system 204, which in turn comprises host processor 204a, host memory 204b, and/or other components.

For example, host processor 204a of host processing system 204 may include processor 102, whereas host memory 204b may include system memory 114. More generally, host processing system 204 may include a variety of processing systems utilized by IHS 202 to perform processing operations related to, for example, executing an Operating System (OS) and/or other software applications.

IHS 202 also comprises embedded controller system 210 that includes embedded controller processor 210a, embedded controller memory 210b, and/or other embedded controller components. For example, embedded controller processor 210a in embedded controller system 210 may include a processor, and embedded controller memory 210b in embedded controller system 210 may include a memory device that includes instructions that, when executed by embedded controller processor 210a, cause embedded controller processor 210a to perform operations discussed further below.

In the illustrated embodiment, embedded controller processor 210a is coupled to the off-host processor 206a via bus 212 such as, for example, a Low-Pin Count (LPC) connection. However, bus 212 may be any variety of physical/logical bus connections that support encrypted communications, including but not limited to, an LPC connection, a USB, a Thunderbolt interface, an $I^2C$, an SPI, a PCI, and/or other bus connections.

IHS 202 also includes network interface controller 214 that provides first network controller 214a, second network controller 214b, and/or other network interface controller components. In some embodiments, network interface controller 214 is compliant with INTEL CORPORATION's Active Management Technology (AMT) and/or "vPro" technology. In an embodiment, first network controller 214a in network interface controller 214 may be segregated, distinct from, and/or otherwise separate from second network controller 214b by assigning to the first network controller 214a a first Media Access Control (MAC) address that is different from a second MAC address that is assigned to the second network controller 214b. In another embodiment, first network controller 214a and second network controller 214b may be segregated from each other in another manner such as, for example, by providing first network controller 214a on a different network interface controller than second network controller 214b.

Host processor 204a of host processing system 204 is coupled to first network controller 214a in network interface controller 214 via bus 216a, and embedded controller processor 210a in embedded controller system 210 is coupled to second network controller 214b in network interface controller 214 via bus 216b. In some embodiments, buses 216a and 216b may be part of the same bus such as, for example, an $I^2C$ connection that couples host processing system 204 and embedded controller system 210 to network interface controller 214. However, bus 214 may be any variety of physical/logical bus connections that support encrypted communications, including but not limited to, $I^2C$, USB, Thunderbolt, SPI, PCI, and/or other bus connections.

Host processor 204a may be configured to only have access to the first network controller 214a by providing host processor 204a a first MAC address that is assigned to first network controller 214a, while embedded controller processor 210a may be configured to only have access to second network controller 214b by providing embedded controller processor 210a a second MAC address that is assigned to second network controller 214b. However, as discussed above, first network controller 214a and second network controller 214b may be provided on different network interface controllers such that buses 216a and 216b are physically separate buses.

IHS 202 is coupled to off-host authentication processing system 206 that includes off-host processor 206a, off-host memory 206b, and/or other off-host processing components. In some cases, off-host authentication processing system 206 may be physically disposed outside of chassis 116—that is, off-host authentication processing system 206 is not a part of IHS 202; and it only coupled to it via bus 212. As used herein, the term "off-host" refers to external off-host authentication processing system 206 being distinct from host processing system 204.

Particularly, off-host processor 206a within off-host authentication processing system 206 may include a secure processor that is segregated, distinct from, and/or otherwise separate from processor 102 in IHS 202, and off-host memory 206b within external off-host authentication processing system 206 may include a memory device that is segregated, distinct from, and/or otherwise separate from system memory 114 in IHS 202 such that off-host memory 206b is accessible by off-host processor 206a but not by host processor 204a. In an example, off-host authentication processing system 206 may be provided, at least in part, using a CONTROLVAULT system that is available from DELL, INC.

Authentication system or device 209 may include, for example, an input device such as a keyboard, a fingerprint reader device or other biometric data reader device, a smart card reader device, an radio frequency identification (RFID) or Near Field Communication (NFC) device that is configured to wirelessly connect to a mobile user device (e.g., a mobile phone), and/or a variety of other authentication devices. Authentication device 209 may be coupled to off-host processor 206 in off-host authentication processing system 206 via USB or Smart Card Interface (SCI) bus 209a. However, bus 209a may be any variety of physical/logical bus connections including but not limited to, USB, SCI, Thunderbolt, $I^2C$, SPI, PCI, and/or other bus connections.

Each of first network controller 214a and second network controller 214b is coupled to network 218 such as, for example, a local area network (LAN), the Internet, and/or a variety of other networks.

Authentication IHS 220 is coupled to network 218. In an embodiment, authentication IHS 220 may be implemented as IHS 100 discussed above with reference to FIG. 1 and/or may include some or all of the components of IHS 100. For example, authentication IHS 220 may be a server IHS or authentication server that may operates to verify user authentication credential inputs and/or verify authentication tokens. In an embodiment, authentication IHS 220 is associated with at least one authentication IHS private key and at least one authentication IHS public key. The at least one authentication IHS private key and the at least one authentication IHS public key may be stored in storage device that is accessible by authentication IHS 220.

In an embodiment, IHS 202 is associated with at least one user IHS private key and at least one user IHS public key. The at least one user IHS private key and the at least one user IHS public key may be stored in storage device that is accessible by off-host authentication processing system 206. For example, the at least one user IHS private key and the at least one user IHS public key may be stored on off-host memory 206b, on host memory 204b, and/or in a variety of other user IHS storage locations. Furthermore, the at least one user IHS public key may be shared with other systems such as, for example, authentication IHS 220.

Directory system 222 is also coupled to network 218. In an embodiment, directory system 222 may include an active directory service available from MICROSOFT CORPORATION. For example, directory system 222 may include an active directory service that is provided on a server IHS and that operates to authenticate and authorize users, assign and enforce security policies, install and update software, and/or perform a variety of other directory system operations.

In an embodiment, network 218, authentication IHS 220, and directory system 222 may be controlled by the same entity. For example, a business or government may provide, house, or otherwise maintain control of each of network 218, authentication IHS 220, and directory system 222 in order to provide an increased level of security using environment 200.

In some embodiments, the system of FIG. 2 may be used to perform out-of-band authentication such that a user must authenticate to off-host authentication processing system 206 in order to access functionality of IHS 202 that is provided by its host processing system 204. The authentication of a user to access the functionality of IHS 202 is controlled by off-host authentication processing system 206, authentication IHS 220, and/or directory system 222 that operate to verify the user and release a token to host processing system 204 that provides the user access to IHS 202.

Particularly, verification of a user may be performed by authentication IHS 220 such that IHS 202 never stores authentication credentials for any user, while authentication tokens are encrypted and exchanged between off-host authentication processing system 206 and authentication IHS 220 such that authentication IHS 220 can send an approval message to directory system 222 to provide for the release of a token to host processing system 204 that allows a user access to IHS 202 if they have been validated. Because host processing system 204 and off-host authentication processing system 206 need not interact in the out-of-band authentication system, host processing system 204 and off-host authentication processing system 206 may be physically segregated (e.g., there may be no communications bus connecting or directly connecting host processing system 204 and external off-host authentication processing system 206) to prevent any access or compromise of host processing system 204 from enabling an unauthorized user to access functionality of IHS 202.

Figure 3:
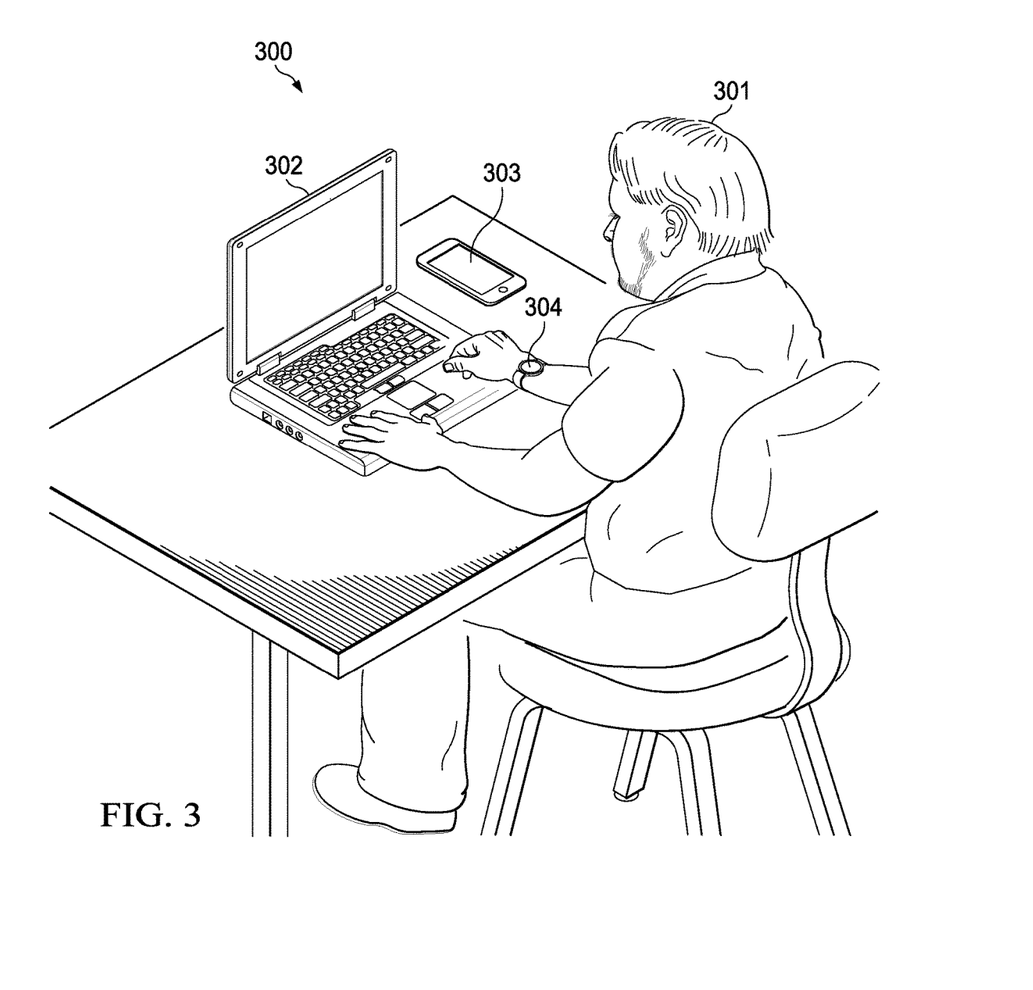
FIG. 3 is a schematic view illustrating an example of an environment where time-based local authentication may be used according to some embodiments.

Turning now to FIG. 3, an example of environment 300 where time-based local authentication methods may be used is depicted. Particularly, user 301 operates IHS 302, which may be implemented as IHS 202 of FIG. 2 that includes off-host authentication processing system 206. Generally speaking, IHS 302 may include any type of IHS such as a laptop computer, desktop computer, etc. (also referred to as a "PC").

Moreover, user 301 may have access to a number of other devices such as, for example, smart phone 303 and/or smart watch 304—each of which may be implemented as its own IHS 100 of FIG. 1. As will be described in more detail below, although shown as watch 304 or phone 303, any other type of computing device (other than IHS 302) that is locally available to IHS 302 via a direct, peer-to-peer network connection (e.g., USB direct, Bluetooth, NFC, RFID, etc.), including other PCs, may be used a secondary IHS in the execution of a method for time-based local authentication.

Figure 4:
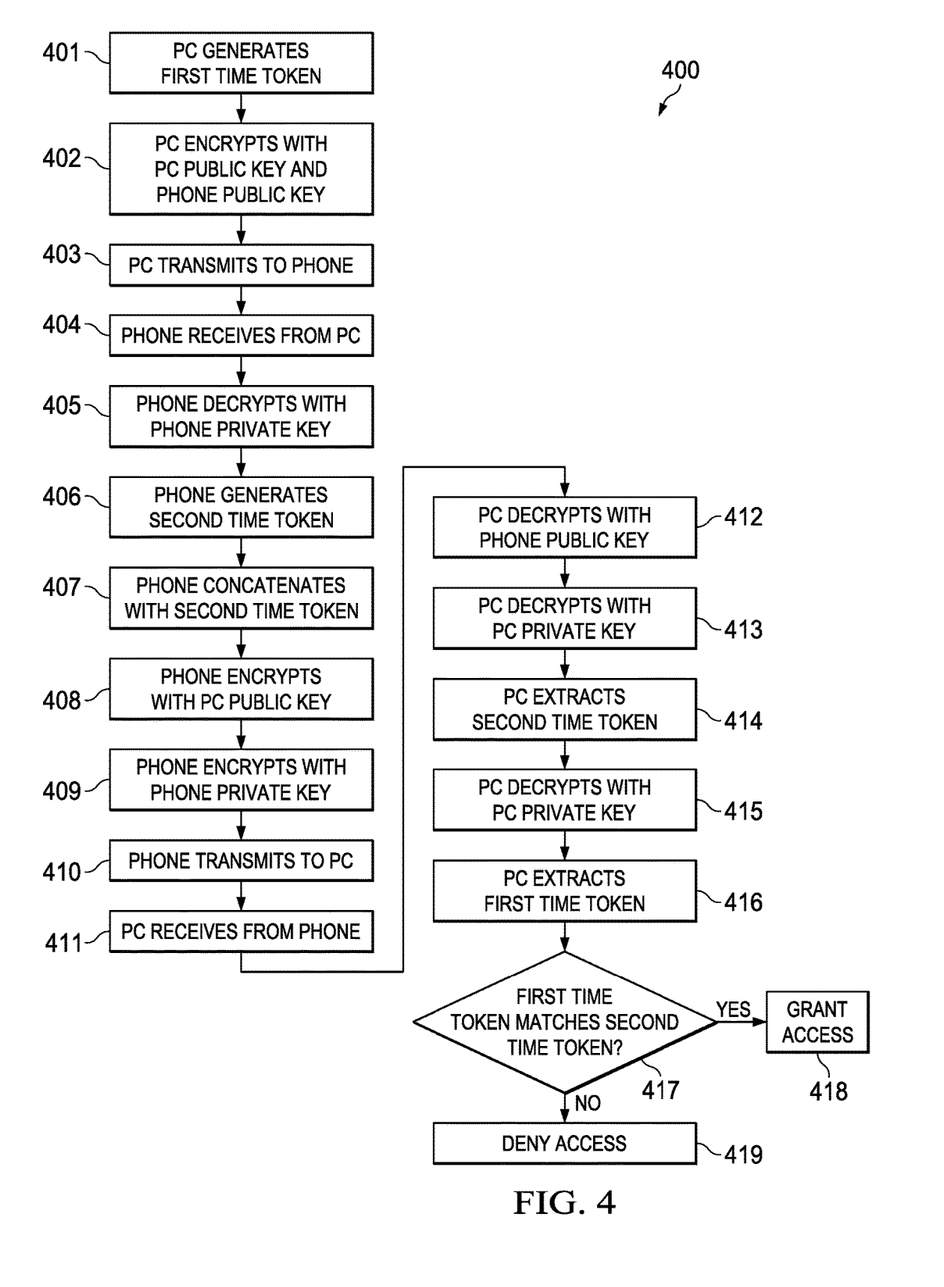
FIG. 4 is a flowchart of an example of a method for time-based local authentication according to some embodiments.
Figure 5:
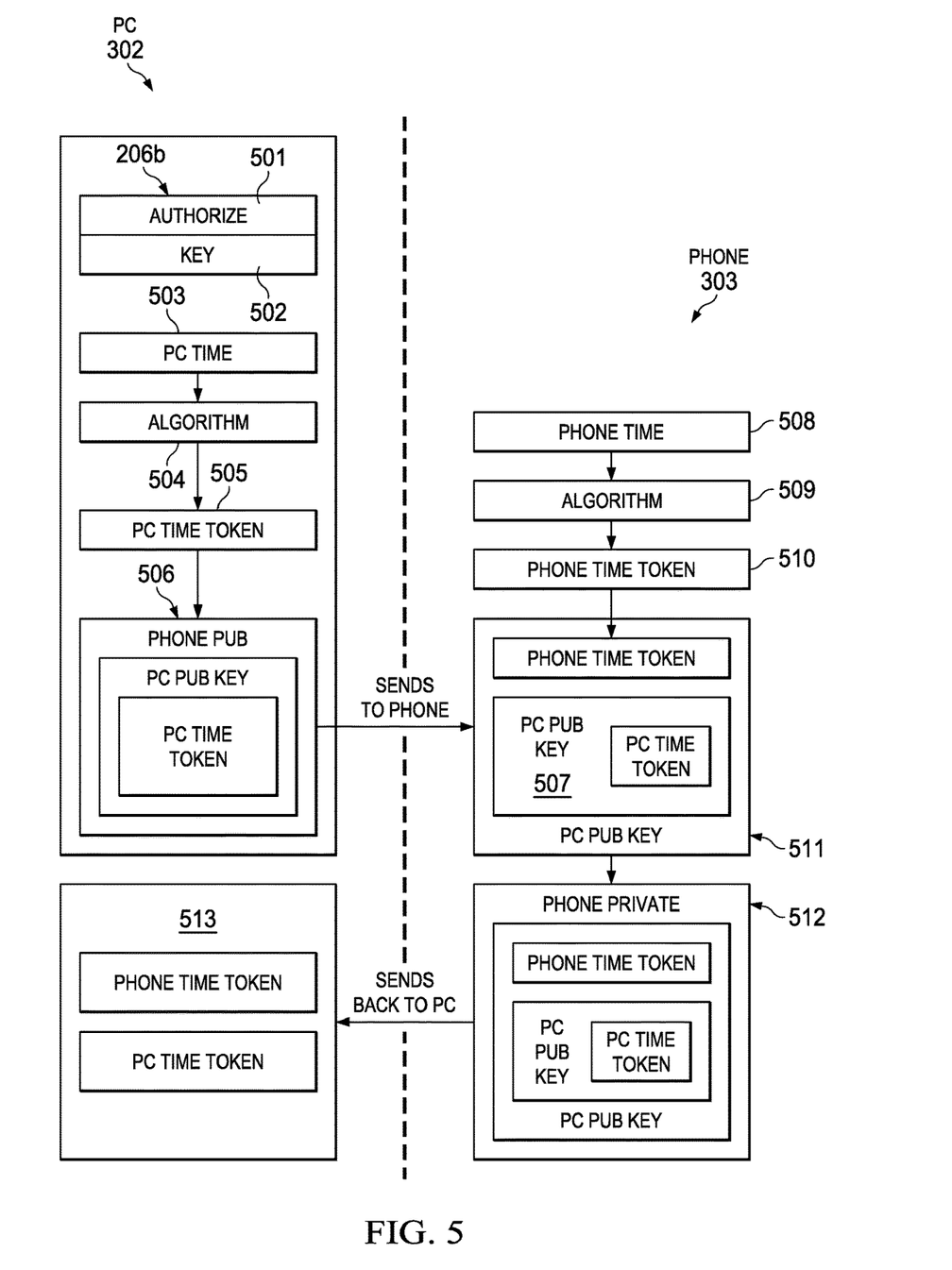
FIG. 5 is a schematic view illustrating an example of elements exchanged during a time-based local authentication event according to some embodiments.

FIG. 4 is a flowchart of an example of method 400 for time-based local authentication and FIG. 5 is a schematic view illustrating an example of elements exchanged during execution of method 400, according to some embodiments. In this non-limiting example, the primary IHS is referred to as "PC" 302 and the secondary IHS is referred to as "phone" 303. In some cases, method 400 may be performed as a user attempts to log into PC 302. More generally, however, it should be noted that method 400 may be also performed in response to any resource access and/or user/device authentication situation.

Generally speaking, the primary IHS, or PC 302, (e.g., IHS 302 of FIG. 3) may be implemented using IHS 202 of FIG. 2, which includes off-host authentication processing system 206. Within off-host memory 206b, off-host authentication processing system 206 may include information (e.g., "key") 502 protected by authentication condition 501. Key 502 is accessible to a calling application executed by host processing system 204 but only upon satisfaction of authentication condition 501, which in this case involves authentication via a local, time-based OTP. That is, in contrast with conventional time-based OTP techniques, method 400 may be performed entirely locally (e.g., between PC 302 and phone 303), without the need for a central or time server.

At block 401, PC 302 generates a first time token, shown as PC time token 505 in FIG. 5. This first time token 505 may be created, for example, by off-host processor 206a executing time-based OTP password algorithm 504, for instance as defined in RFC 6238, using local PC time 503 as a seed or part thereof. It should be understood, however, that block 401 does not require the use of a standard. Accordingly, in other implementations, any other suitable OTP algorithms may be used.

At block 402, PC 302 encrypts the first or PC time token 505 with a PC public encryption key, and then encrypts the result of that operation with a phone public encryption key, thus resulting in first payload 506. At block 403, PC 302 transmits first payload 506 to phone 303, for example, using a peer-to-peer connection. It should be understood, however, that block 403 does not require the use of a peer-to-peer connection. Accordingly, in other implementations, any other suitable type of connection may be used.

At block 404, phone 303 receives first payload 506 from PC 302. At block 405, phone 303 decrypts first payload 506 using the phone private key into second payload 507. At block 406, phone 303 generates a second or phone time token 510. Phone time token 510 may be created, for example, by executing time-based OTP password algorithm 509, which may be exactly the same as algorithm 504 used by PC 302, but using local phone time 508 as a seed or part thereof.

At block 407 phone 302 concatenates the result of that operation with phone time token 510, and at block 408, phone 302 encrypts the concatenation with the PC public key, thus resulting in third payload 511. At block 409, phone 303 encrypts third payload 511 with the phone private key, thus resulting in fourth payload 512. Then, at block 410, phone 303 transmits fourth payload 512 back to PC 302.

At block 411, PC 302 receives fourth payload 512. At block 412, PC 302 decrypts fourth payload 512 with the phone public key into a fifth payload, and at block 413 PC 302 PC 302 decrypts the fifth payload into a sixth payload. At block 414, PC 302 extracts second or phone time token 510 from the sixth payload. At block 415, PC 302 decrypts the remaining encrypted first time token with the PC private key to extract the first or PC time token 505 at block 416.

At block 417, PC 302 compares the extracted first or PC time token 505 with the extracted second or phone time token 510 with each other. At block 418, if the first time token matches the second time token exactly, or if they are within an accepted time window of each other (e.g., 30 seconds), then at block 415 off-host processor 206a PC 302 may grant a calling application executed by host processor 204a access to protected key 502 stored in off-host memory 206b. Otherwise, access may de denied at block 419.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," when used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A primary Information Handling System (IHS) for performing time based local authentication comprising: a processor; and
   a memory coupled to the processor, the memory having program instructions stored thereon that, upon execution, cause the primary IHS;
   generate a first time token;
   maintain a public key associated with a secondary IHS;
   encrypt the first time token with a primary IHS public key associated with the primary IHS and with the secondary IHS public key associated with the secondary IHS into a first payload;
   transmit the first payload to the secondary IHS via a local network, wherein the secondary IHS is configured to decrypt the first payload with a primary IHS public key associated with the primary IHS and generate a second time token, wherein the second time token is concatenated with the encrypted first time token and encrypted with the primary IHS public key of the primary IHS maintained by the secondary IHS;
   receive the second time token from the secondary IHS;
   decrypt the second time token;
   determine whether the first time token matches the second time token; and in response to the first time token matching the second time token,
   provide the primary IHS with access to a protected resource stored in an off-host memory.

2. The primary IHS of claim 1, wherein the first time token and the second time token are generated using a one-time password (OTP) algorithm.

3. The primary IHS of claim 1, wherein the IHS includes a laptop or desktop computer, and wherein the secondary IHS includes a phone, tablet, or watch.

4. The primary IHS of claim 1, wherein to determine whether the first time token matches the second time token, the program instructions, upon execution, further cause the primary IHS to determine whether the first time token is within a selected time interval from the second time token.

5. The primary IHS of claim 1, wherein the processor and the memory are part of an off-host authentication processing system within the primary IHS, wherein the primary IHS further comprises an embedded controller coupled to the host processor and to the off-host processor, and wherein the off-host authentication processing system provides a hardware environment segregated from a host processor and a host memory within the IHS.

6. The primary IHS of claim 5, wherein the protected resource includes a password stored in the off-host memory as an object retrievable by the off-host processor only upon a determination that the first time token matches the second time token.

7. The primary IHS of claim 6, wherein generating the first time token occurs in response to user attempting to log into the primary IHS, and wherein providing the primary IHS with access to the protected resource includes allowing the user to log into the primary IHS.

8. The primary IHS of claim 1 wherein the secondary IHS is configured to decrypt the first payload with a secondary IHS private key associated with the second IHS into a second payload.

9. The primary IHS of claim 8, wherein the secondary IHS is configured to concatenate the second payload with the second time token, to encrypt the concatenation with the primary IHS public key into a third payload, and to encrypt the third payload with the secondary IHS private key into a fourth payload, and wherein transmitting the second time token to the IHS includes transmitting the fourth payload to the primary IHS.

10. The primary IHS of claim 9, wherein receiving the second time token from the secondary IHS includes receiving the fourth payload from the secondary IHS, and wherein the program instructions, upon execution by the processor, further cause the processor to decrypt the fourth payload with the secondary IHS public key into a fifth payload.

11. The primary IHS of claim 10, wherein the program instructions, upon execution by the processor, further cause the processor to decrypt the fifth payload with the primary IHS private key into a sixth payload.

12. The primary IHS of claim 11, wherein the program instructions, upon execution by the processor, further cause the processor to extract the second time token and an encrypted first time token from the sixth payload.

13. The primary IHS of claim 12, wherein the program instructions, upon execution by the processor, further cause the processor to decrypt the primary IHS time token with the primary IHS private key to extract the first time token.

14. A memory storage having computer readable instructions stored thereon for performing time based local authentication that upon execution by a processor of a primary Information Handling System (IHS), cause the primary IHS to:
  generate a first time token;
  maintain a public key associated with a secondary IHS;
  encrypt the first time token with a primary IHS public key associated with the primary IHS and with the secondary IHS public key associated with a secondary IHS into a first payload;
  transmit the first payload to the-secondary IHS via a local network, wherein the secondary IHS is configured to decrypt the first payload with a primary IHS public key associated with the primary IHS and generate a second time token and wherein the second time token is concatenated with the encrypted first time token and encrypted with the primary IHS public key of the primary IHS maintained by the secondary IHS;
  receive the second time token from the secondary IHS;
  decrypt the second time token;
  determine whether the first time token matches the second time token;
  and in response to the first time token matching the second time token, provide the primary IHS with access to a protected resource stored in an off-host memory.

15. The memory storage of claim 14, wherein the processor and the memory storage are part of an off-host authentication processing system within the primary IHS, wherein the primary IHS further comprises an embedded controller coupled to the host processor and to the off-host processor, and wherein the off-host authentication processing system provides a hardware environment segregated from a host processor and a host memory within the primary IHS.

16. The memory storage of claim 15, wherein the protected resource includes a password stored in the off-host memory as an object retrievable by the off-host processor only upon a determination that the first time token matches the second time token.

17. The memory storage of claim 14, wherein the secondary IHS:
  (a) decrypts the first payload with a secondary IHS private key associated with the second IHS into a second payload,
  (b) concatenates the second payload with the second time token,
  (c) encrypts the concatenation with the primary IHS public key into a third payload, and
  (d) encrypts the third payload with the secondary IHS private key into a fourth payload;
  wherein transmitting the second time token to the primary IHS includes transmitting the fourth payload to the primary IHS, and wherein receiving the second time token from the secondary IHS includes receiving the fourth payload from the secondary IHS;
  and wherein the computer readable program instructions, upon execution by the processor, further cause the primary IHS to: decrypt the fourth payload with the secondary IHS public key into a fifth payload;
  decrypt the fifth payload with the primary IHS private key into a sixth payload;
  extract the second time token and an encrypted first time token from the sixth payload;
  and decrypt the encrypted first time token with the primary IHS private key to extract the first time token.

18. A method for performing time based local authentication in a primary Information Handling System (IHS), the method comprising:
  generating a first time token;
  maintain a public key associated with a secondary IHS;
  encrypting the first time token with a primary IHS public key associated with the IHS and with the secondary IHS public key associated with the secondary IHS into a first payload;
  transmitting the first payload to the secondary IHS via a local network, wherein the secondary IHS is configured to decrypt the first payload with a public key associated with the primary IHS and generate a second time token and wherein the second time token is concatenated with the encrypted first time token and encrypted with the public key of the primary IHS maintained by the secondary IHS;
  receiving the second time token from the secondary IHS;
  decrypt the second time token;
  determining whether the first time token matches the second time token;
  and in response to the first time token matching the second time token, providing the primary IHS with access to a protected resource stored in an off-host memory.

19. The method of claim 18, wherein the secondary IHS:
  (a) decrypts the first payload with a secondary IHS private key associated with the second IHS into a second payload,
  (b) concatenate the second payload with the second time token,
  (c) encrypts the concatenation with the primary IHS public key into a third payload,
  (d) and encrypts the third payload with the secondary IHS private key into a fourth payload;
  wherein transmitting the second time token to the primary IHS includes transmitting the fourth payload to the primary IHS, wherein receiving the second time token from the secondary IHS includes receiving the fourth payload from the secondary IHS; and
  wherein the method further comprises:
  decrypting the fourth payload with the secondary IHS public key into a fifth payload;

decrypting the fifth payload with the primary IHS private key into a sixth payload;
extracting the second time token and an encrypted first time token from the sixth payload;
and decrypting the encrypted first time token with the primary IHS private key to extract the first time token.

* * * * *